(12) United States Patent
Spahr

(10) Patent No.: US 7,562,755 B2
(45) Date of Patent: Jul. 21, 2009

(54) REAR WHEEL HUB, IN PARTICULAR FOR BICYCLES

(75) Inventor: Stephan Spahr, Lengnau (CH)

(73) Assignee: DT Swiss, Inc., Grand Junction, CO (US)

(*) Notice: Subject to any disclaimer, the term of this patent is extended or adjusted under 35 U.S.C. 154(b) by 174 days.

(21) Appl. No.: 11/482,538

(22) Filed: Jul. 7, 2006

(65) Prior Publication Data
US 2008/0006500 A1  Jan. 10, 2008

(51) Int. Cl.
*F16D 41/24* (2006.01)
(52) U.S. Cl. .................. 192/64; 192/46; 192/69.81; 192/30 V; 301/110.5
(58) Field of Classification Search ............... 192/64
See application file for complete search history.

(56) References Cited

U.S. PATENT DOCUMENTS

| | | | | |
|---|---|---|---|---|
| 2,869,700 | A | * | 1/1959 | Bowden .................. 192/69.81 |
| 5,964,332 | A | * | 10/1999 | King ........................ 192/64 |
| 6,123,179 | A | * | 9/2000 | Chen ........................ 192/64 |
| 6,588,564 | B1 | * | 7/2003 | Jager et al. ................ 192/64 |
| 2002/0003076 | A1 | * | 1/2002 | Taylor ....................... 192/64 |

FOREIGN PATENT DOCUMENTS

| | | |
|---|---|---|
| DE | 19846673 | 4/2000 |
| DE | 19856627 | 6/2000 |
| EP | 1121255 | 8/2001 |
| EP | 1140526 | 10/2001 |
| WO | WO 9904988 A1 * | 2/1999 |

* cited by examiner

*Primary Examiner*—Richard M. Lorence
(74) *Attorney, Agent, or Firm*—Greer, Burns & Crain, Ltd.

(57) ABSTRACT

A hub for bicycles, having an axle and a shell, two bearing units arranged substantially between the hub axle and the hub shell, and a rotor rotatably supported relative to the hub axle for receiving a sprocket of the rotor, and a freewheel having two toothed disc units with biased tooth faces for transmitting the drive torque from the rotor to the hub shell. The two toothed disc units are disposed around the hub axle upon assembly, they are, at idle, disposed transverse to the hub axle. At least one toothed disc unit includes a toothed disc having a hole, a radial wall and an axial toothed wall, wherein an inner diameter of the hole is smaller at the axial wall than an inner dimension in the radial wall to form a receiving space at the toothed disc between the clear inner diameter of the axial wall and the radial wall.

18 Claims, 4 Drawing Sheets

REAR WHEEL HUB, IN PARTICULAR FOR BICYCLES

BACKGROUND

The invention relates to a rear wheel hub, in particular for bicycles. In the field of sports including semi-professional and also professional cycling, rear wheel hubs for bicycles as a rule allow the user to employ many different transmission ratios. In most cases, chain shifting devices are employed where a plurality of sprockets is disposed at the rear wheel hub to allow the different transmission ratios. To ensure an optimal riding style e.g. in steep downhill rides a freewheel is provided to enable the rider to let the bicycle roll without pedaling.

In the field of high quality cycling the stressability and weight play a major role. The users consider it important to have high-grade components that are easy to maintain where each gram of weight counts.

In the prior art, rear wheel hubs with different freewheels have been disclosed. From DE 198 56 627 A1 for example a rear wheel hub having a ratchet freewheel has become known where drive torque is transmitted via ratchet pawls from the rotor to the hub shell. It is a disadvantage of such hubs that in assembly the freewheel pawls must be inserted separately which will result in a large amount of time and work for regular, e.g. daily, maintenance. Also these hubs are comparatively heavy.

A simpler assembly and maintenance is provided by a rear wheel hub known for example from DE 198 47 673 A1 where torque is transmitted through a pair of toothed discs provided with axial, meshing toothing at their adjacent side faces. The torque applied is reliably transmitted in the drive direction while in the opposite rotational direction the toothed discs axially diverge from one another, thus allowing freewheeling.

A freewheel must be configured for high torque loads of up to 400 Nm and higher to reliably transmit the loads occurring. This is a torque which e.g. in automobiles will not occur in the usual family cars but e.g. in sports and racing vehicles. To reliably transmit these very high loads, the toothed discs of the freewheel in the known hub are massive, of solid material. The disadvantage is the comparatively high weight of the toothed discs which constitutes a substantial portion of the total weight.

It is therefore the object of the present invention to provide a rear wheel hub which combines a low weight with easy maintenance without impairing durability.

SUMMARY OF THE INVENTION

The rear wheel hub of the invention is in particular provided for use with bicycles or the like and comprises a hub axle and a hub shell disposed substantially concentric relative to said hub axle. At least two bearing units are provided which are arranged substantially between the hub axle and the hub shell such that the hub shell is rotatably supported relative to the hub axle. A rotor is provided that is rotatably supported relative to the hub axle and configured such that at least one toothed wheel or sprocket can be disposed on the rotor. A freewheel device is provided which is arranged between the rotor and the hub shell and comprises two toothed disc units whose tooth faces are urged toward one another by a biasing device for transmitting the drive torque from the rotor to the hub shell. The two toothed disc units are disposed around the hub axle and in a correctly assembled hub they are disposed, at least in the idle state, transverse to the longitudinal direction of the hub axle. At least one toothed disc unit includes a toothed disc comprising a through hole and a radial wall and an axial wall having axial toothing. The inner diameter of the through hole is smaller at the axial wall than an inner dimension and in particular an inner diameter in the region of the radial wall such that a receiving space is formed at the toothed disc unit around the hub axle between the inner diameter of the axial wall and the inner dimension of the radial wall.

The rear wheel according to the invention is equipped with the rear wheel hub according to the invention described above. The rear wheel furthermore comprises a rim and connecting elements between the rim and the rear wheel hub.

The rear wheel hub according to the invention and the rear wheel according to the invention have many advantages. Compared to conventional rear wheel hubs with ratchet freewheels the rear wheel hub according to the invention has a significant advantage in terms of maintenance since for maintenance the hub can readily be remounted, cleaned and reattached. In comparison to the rear wheel hub with a toothed disc freewheel as known from the prior art one of the advantages of the rear wheel hub according to the invention is that the receiving space at the toothed disc can be filled with a material that is lighter in weight than the material of the toothed disc or such that the receiving space may be filled with such a structure and such a material as to allow sound adaptation and/or sound reduction in operating the freewheel. Concurrently the weight can be considerably reduced. Since the weight of the toothed discs can be reduced, the freewheel response rate will increase even further.

The toothed disc of the toothed disc unit according to the present invention has an overall ring-type or disc-type configuration and includes an overall axial width and a radial outer diameter. The toothed discs in particular are substantially arranged concentric relative to the hub axle such that the axial tooth faces are orientated transverse and in particular substantially perpendicular to the longitudinal axis or the symmetry axis of the hub axle.

In a preferred specific embodiment of the rear wheel hub according to the invention at least one toothed disc unit and/or at least one toothed disc is supported floating so as to allow tilting relative to the plane transverse to the longitudinal direction of the hub axle. Preferably both of the toothed disc units are supported floating such that when one or both of the toothed discs are tilted the torque will be reliably transmitted from the rotor to the hub shell.

Preferred specific embodiments of the invention provide that at least one receiving ring is received in the receiving space. Preferably each receiving space of each toothed disc unit receives at least one receiving ring. Preferably at least part of the receiving ring consists of a material selected from a group of materials comprising light metals, plastic and fiber-reinforced plastic, and the like. It is particularly preferred to use lightweight materials so as to achieve weight saving in the entire hub.

A preferred specific embodiment of the invention provides for the receiving ring to serve for damping the vibrations of the toothed disc unit or the toothed disc freewheel. It is conceivable that vibrations of specific frequencies and/or amplitudes are primarily damped. The resonance frequency can be adjusted to the conditions given in operation to enhance operational safety e.g. by damping the resonance frequency to prevent that the vibrational amplitude builds up.

Preferably the receiving space and/or the receiving ring is/are structured and configured such that resonance can be adjusted. Resonance may be adjusted through the shape and the material selected for the receiving ring and the shape of the receiving space such that resonance adjustment is possible and preferred even with an empty receiving space. If no receiving ring is inserted, overall weight saving will be particularly high. This will contribute to agreeable riding properties.

Resonance adjustment may be employed to specifically influence the acoustics e.g. to allow operational noises agreeable to the rider while disagreeable frequencies are damped more intensely. This will contribute to agreeable riding properties.

The rear wheel hub according to the invention also offers the quite significant advantage that the reduced weight of the entire toothed disc unit due to the receiving space not only decreases the total hub weight but also further enhances the dynamic freewheel properties. The reduced weight of the moving part of the toothed disc unit enhances the dynamic properties with the biasing force unchanged, since acceleration of the toothed disc unit is considerably enhanced due to the reduced weight. Operation of the rear wheel hub according to the invention is thus ensured to be more dependable and reliable. The response time of the freewheel is considerably faster over the prior art.

Preferably at least one toothed disc unit is U-shaped in cross-section with the legs of the U-shaped cross-section extending radially inwardly. The configuration is in particular such that the toothed disc unit and in particular the toothed disc is U-shaped in cross-section on a plane transverse and in particular perpendicular to the toothed disc.

The structure of the toothed disc unit in the axial direction is as follows: A first axial ring disc with a small inner diameter which also forms the axial wall with the axial toothing, is followed by a cylinder or the like with a larger inner diameter which forms the radial wall, which in turn is followed by a second axial ring disc with a smaller inner diameter. The inner diameters of the first and the second axial ring discs or the axial walls are preferably similar and in particular identical. One of the two axial ring discs is provided with axial toothing which teeth extend sawtooth-like away from the axial surface in particular round the circumference. The sawtooth shape ensures that the axial toothing reliably transmits the applied torque to the opposed toothed disc in one rotational direction while in the opposite rotational direction the freewheel function is fulfilled.

In a preferred specific embodiment of the invention the toothed disc unit and in particular the toothed disc comprises at least one axial disc and a separate ring sleeve. The axial disc may be threadedly connected with the ring sleeve or axial pins may be provided to engage in corresponding bores in the axial disc and/or the ring sleeve to ensure a non-rotating connection of the axial disc with the ring sleeve. It is in particular conceivable to employ two axial discs with a ring sleeve provided between them. In such a case the toothed disc or the toothed disc unit is U-shaped in cross-section as described above. One of the axial discs is then provided with the axial toothing for transmitting the torque while the biasing device acts on the other axial disc to bias toward one another the toothed disc units of the freewheel and to bring the two toothed discs into the engagement position.

It is also conceivable to equip one toothed disc with one ring sleeve and one axial disc only wherein the axial toothing for transmitting the torque is provided on one axial face of the axial disc while the biasing device acts on the other face of the axial disc to bias both toothed discs into engagement with one another. In all of these cases the toothed disc may consist of one or more component parts.

Preferred specific embodiments of the invention provide for each toothed disc unit to have a radially disposed outer profile which outer profile of the one toothed disc unit cooperates with an inner profile of a threaded sleeve which is screwed into the hub shell. The outer profile of the other toothed disc unit cooperates with an inner profile in the rotor for transmitting the applied drive torque. The configuration is such that at least one and in particular both toothed discs can be axially displaced while torque can be transmitted between the one toothed disc unit and the hub shell, and between the other toothed disc unit and the rotor. The outer profile can be configured as an outer toothing.

A preferred embodiment of the invention provides for the hub axle to be configured hollow and having a larger inner diameter than the outer hub diameter in the region provided for being inserted into a dropout at a bicycle frame. Such configuration allows a reduced overall hub weight while concurrently achieving high strength.

Preferably at least one end of the hub axle is provided with a separate adapter ring comprising a diameter section provided for being inserted into a dropout at a bicycle frame to retain the hub in the bicycle frame such that the adapter ring is configured as a load-bearing component. In this configuration the adapter ring also serves as a limit stop.

Advantageously the adapter ring comprises a flange and in particular a double flange which in conjunction with the hub shell achieves a non-contact sealing of the hub shell. The flange or the two flanges of the double flange, being in particular configured as a ring, extend radially outwardly far enough so as to leave only a narrow gap between the existing adapter ring and the hub shell which rotates during operation. When a double flange is used, each flange of the double flange preferably comprises a narrow sealing gap while an expansion chamber is present between the two flanges.

For humidity or dirt to penetrate into the hub interior from outside, the humidity must first pass through the outer narrow sealing gap. The speed of the entering medium is greatly reduced through the expansion chamber between the two flanges of the double flange such that the entering medium will advance toward the second sealing gap at the second flange of the double flange at a considerably reduced rate such that humidity or dirt can reliably be prevented from entering through the two flanges of the double flange.

If humidity should ever actually enter, any deposited humidity will be deposited radially outwardly during operation of the hub such that it can re-exit through the sealing gap.

Another preferred specific embodiment of the invention includes a rotor provided with radially outwardly extending engaging means which serve to non-rotatably attach gear wheels or sprockets to the rotor. At least one engaging means and in particular substantially each of the engaging means on the rotor comprises at least one longitudinal groove. The total weight of the rotor and thus of the hub can thus be reduced.

Between the rotor and the hub shell a labyrinth seal is advantageously provided which comprises a sealing gap facing radially outwardly and which is followed by a radially inwardly expansion chamber which in turn is followed by a second sealing gap radially inwardly toward the hub. This configuration also achieves a reliable sealing effect since the flow rate of any humidity passing through the first sealing gap is considerably reduced in the expansion chamber such that even when employing a water jetting system for cleaning a bicycle equipped with a rear wheel hub according to the invention the sealings will reliably shield the hub interior.

In a preferred specific embodiment of the configuration described immediately above, the second sealing gap is delimited by a conical rotor wall section wherein the diameter of said conical wall section increases toward the hub shell. This is to ensure a particularly reliable operation of the labyrinth seal. For example if in a stationary bicycle, water should pass from above through the first sealing gap, the described configuration with a conical rotor wall section will guide the humidity away from the hub interior toward the peripheral annular groove where the conical wall section begins. Such humidity will collect there and flow downward due to gravity so as to escape outward through the first sealing gap.

In contrast to this the prior art has employed a labyrinth seal with the second sealing gap being delimited by a cylindrical rotor wall section. In this way it cannot be ensured that humidity entering through the first sealing gap is drained. The configuration according to the invention of the sealing gap between rotor and hub shell will achieve a considerably enhanced sealing effect. The applicant reserves the right to apply separate protection for such configuration.

Another preferred embodiment of the rear wheel hub according to the invention provides for the hub shell to be equipped with at least one and in particular with two hub flanges for attaching spokes. The hub flanges in particular extend substantially radially outwardly from the hub shell. The radially outward end of such hub flange is concave in cross-section. This configuration provides more material at the side edges of the hub flange than in conventional hub flanges with a convex cross-section at the radially outward end. The material that is additional compared to the prior art causes increased stressability since in such a configuration there is more material compared to the prior art where stress load is highest while allowing to save material and thus weight in the center of the flange.

For a hub according to the invention equipped with one or two adapter rings or limit stops it is preferred to provide a full perimeter sealing ring such as in particular an O-ring to reliably retain the adapter ring on the hub axle while also preventing that dirt and humidity penetrate into the hub interior. This also allows to dismantle the hub manually without the need for any tool.

BRIEF DESCRIPTION OF THE DRAWINGS

Other advantages and embodiments of the present invention can be taken from the embodiment which will now be explained with reference to the accompanying drawings.

DETAILED DESCRIPTION OF THE PREFERRED EMBODIMENT

An embodiment of the rear wheel hub 1 according to the invention will now be described with reference to the accompanying drawings.

Figure 1:
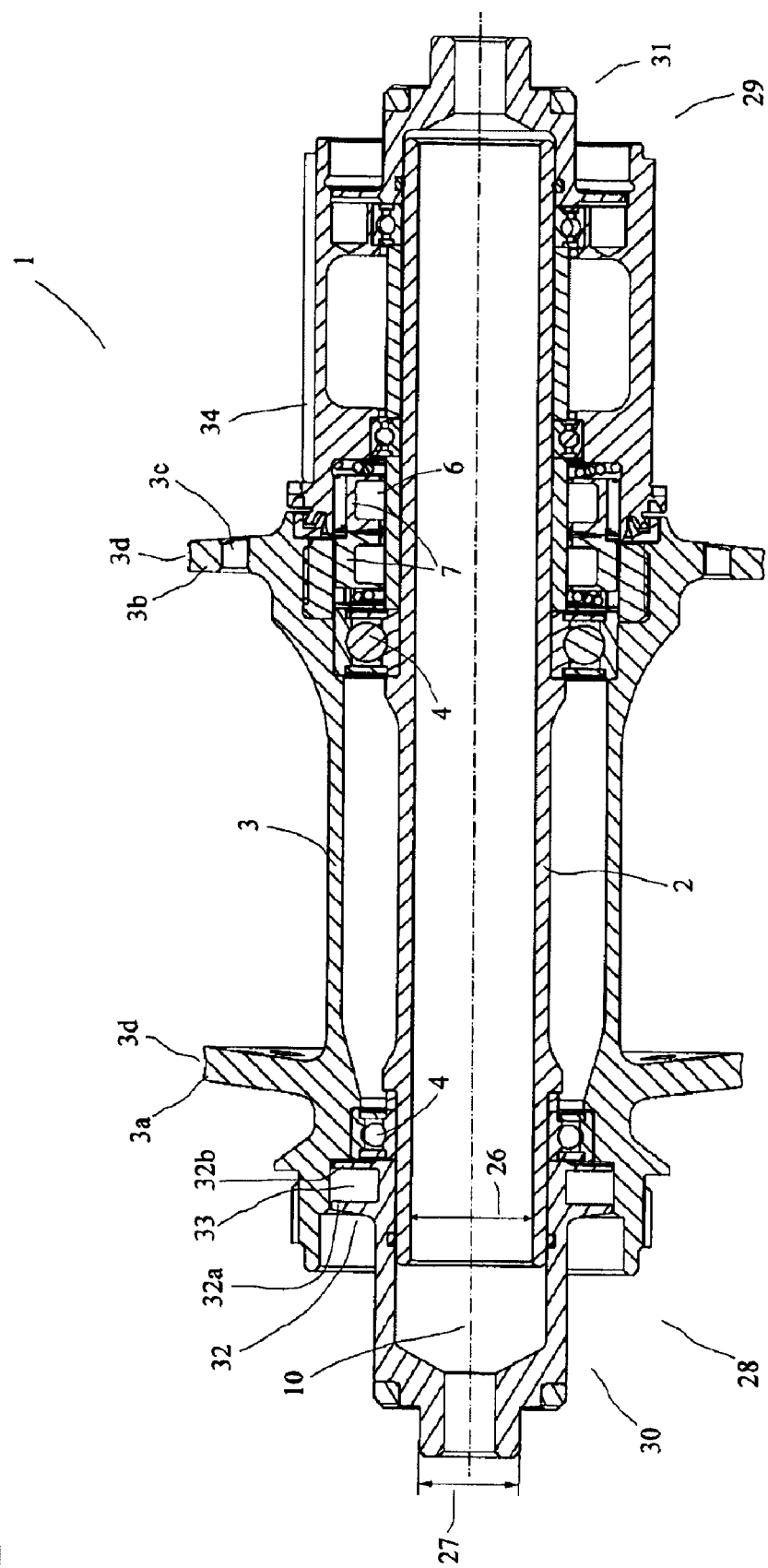
FIG. 1 is a cross-section of a rear wheel hub according to the invention.
Figure 10:
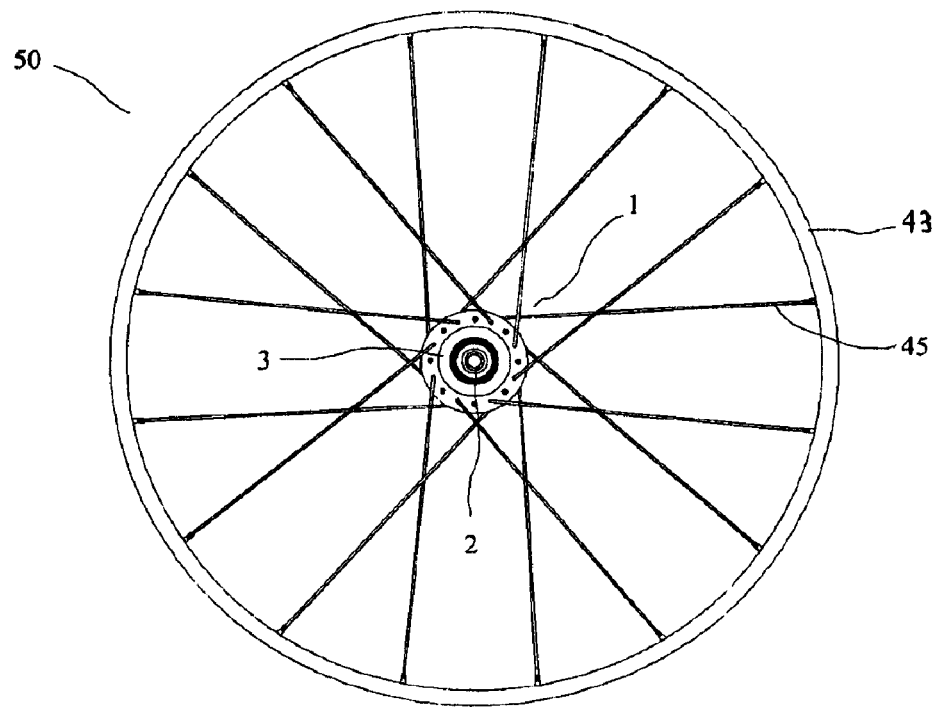
Fig. 10 is a side view of a rear wheel including the rear wheel hub according to Fig.1.

The rear wheel hub 1 of a rear wheel 50 according to the invention, as illustrated in FIG. 1 and FIG. 10, comprises a stationary hub axle 2. The hub shell 3 is supported by bearings 4 to be rotatable relative to the hub axle 2.

Between the rotor 5, which serves to receive a sprocket cluster, and the hub shell 3 a freewheel 6 is disposed comprising in this case two toothed discs 7 as toothed disc units. The outside surface of the rotor 5 is provided with engaging dogs 34 which comprise on the outer surface longitudinal grooves parallel to the longitudinal direction 10 or the symmetry axis of the hub. The longitudinal grooves (see FIG. 2) allow to reduce the weight of the rotor and thus of the entire hub so as to still further reduce the relatively low weight of the hub.

The hub shell 3 in this embodiment comprises two radially disposed flanges 3a and 3b provided with bores 3c which serve for receiving spokes or connecting elements 45 to connect the hub 1 with a rim 43.

The radially outward ends of the flanges 3a and 3b are configured to be convex such that the material is higher at the outer face of each hub flange than in the center region of this hub flange. Thus, much material is present at particularly stressed positions while the less stressed radially outward ends of the flanges 3a and 3b are convex in contour 3d or convex in cross-section so as to save material there and to save weight overall.

The hub axle 2 is configured hollow. The inner diameter 26 is larger than the outer diameter 27 of the hub 1 which is received in a dropout of a bicycle. In this case the hub comprises at its ends 28 and 29 an adapter ring or limit stop 30 and 31 each of which are attached to the hub axle 2 when assembling the hub 1. The limit stops 30 and 31 are provided at the axially outwardly ends which are received in the dropouts. The diameter 27 of the receiving sections is smaller than the inner diameter 26 of the hollow hub axle 2.

Both limit stops have O-rings in their interiors for clamping the limit stops on the hub axle. The entire hub can be assembled and dismantled manually, by hand, without employing any tool.

The limit stop 30 positioned on the left in FIG. 1 comprises on the hub side a radial double flange 32 which comprises two annular flanges 32a and 32b. Between the two flanges an expansion chamber 33 is provided extending annularly around the hub axle. As humidity or dirt hits the outer flange 32a and passes through the gap, the flow rate is considerably reduced in the expansion chamber 33 since the flow will fan out and expand. In this way it is substantially reliably prevented that humidity penetrates further till the second gap at the second flange 32b or even passes through the second gap at the second flange 32b. During a ride any entering humidity is displaced radially outwardly. In standstill, condensate will collect at the bottom due to gravity and escape outward so as to provide reliable protection.

Figure 9:
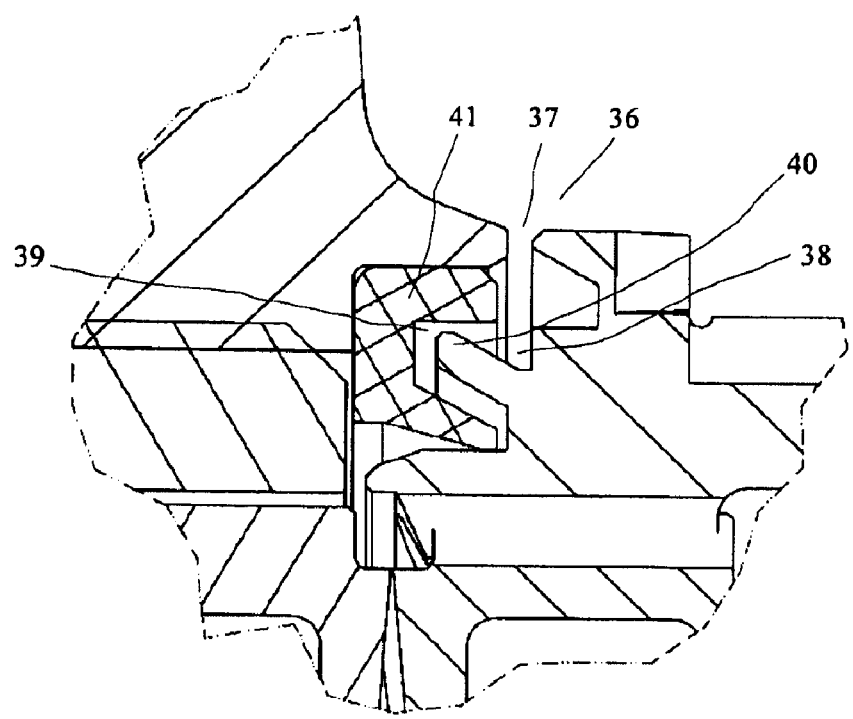
FIG. 9 is a detail of the labyrinth seal between the rotor and the hub shell of the hub according to FIG. 1.

The labyrinth seal 36 on the other side between the rotor and the hub shell 3 is shown in detail in FIG. 9. A first sealing gap 37 is disposed radially outwardly. During a ride any water entering is displaced radially outwardly due to centrifugal forces. If during cleaning e.g. with a water jetting system, water should ever enter through the first sealing gap 37 the flow rate will be considerably reduced in the expansion chamber 38. The expansion chamber 38 is followed by a second sealing gap 39. The sealing gap 39 is delimited by a conically extending wall section 40 which increases in diameter in the direction toward the hub shell 3. The sealing effect is thus considerably improved since any humidity entering is displaced radially outwardly due to centrifugal forces. In standstill, water condensation will collect at the radially inward end of the conical wall section 40 from where it can drip out.

If any humidity should ever pass through the second sealing gap, an elastomer seal 41 is provided downstream.

Figure 2:
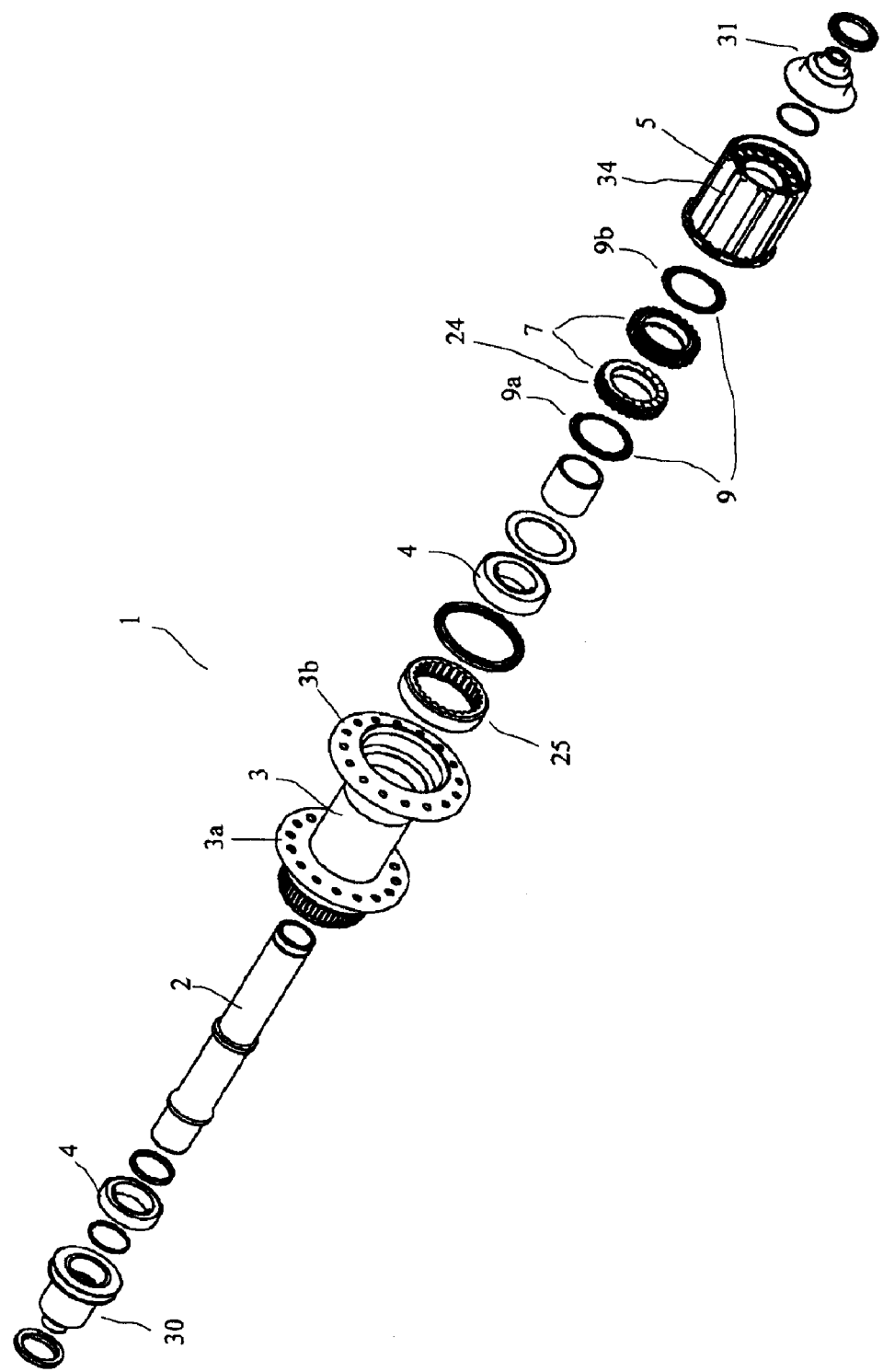
FIG. 2 is an exploded view in perspective of the hub according to FIG. 1.

An exploded view in perspective is shown in FIG. 2. As can be seen, the entire hub can be assembled by hand without any tool. The springs 9a and 9b of the biasing devices bias the toothed discs 7 of the freewheel device 6 toward one another.

Figure 3:
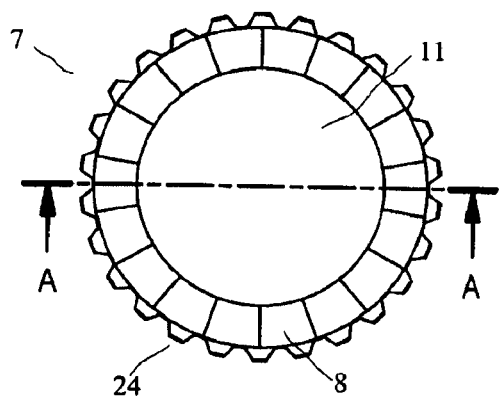
FIG. 3 is a top plan view of a toothed disc of the rear wheel hub according to FIG. 1.
Figure 4:
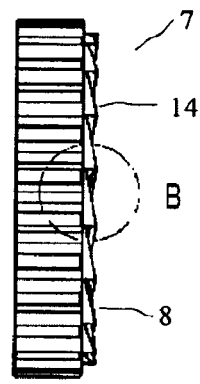
FIG. 4 is a side view of the toothed disc according to FIG. 3.
Figure 5:
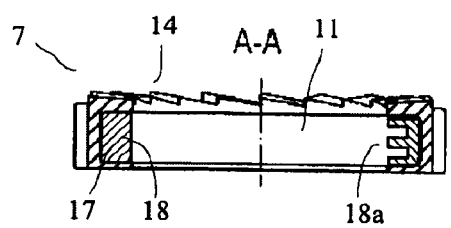
FIG. 5 is a cross-section of a first embodiment of the toothed disc according to FIG. 3.
Figure 6:
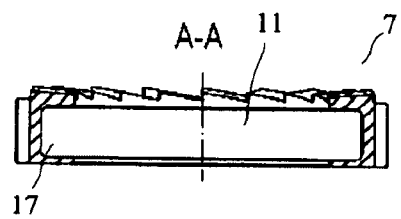
FIG. 6 is a cross-section of a second embodiment of the toothed disc according to FIG. 3.

FIG. 3 is a top plan view of a toothed disc 7, while FIG. 4 is a side view. FIGS. 5 to 8 show different cross-sectional views of conceivable embodiments of the toothed disc units or toothed discs 7.

The toothed discs 7 have a center through hole 11. The axial wall 13 is provided with a tooth face 8 with axial toothing 14. The axial toothings 14 of two toothed discs 7 interact to transmit drive torque in one rotational direction while in the other rotational direction the freewheel function is fulfilled. One or both toothed discs 7 will be displaced axially outwardly such that the tooth surfaces 8 slide past one another.

The appropriate outer walls of the radial walls 12 are provided with an outer toothing 24 which interacts with an inner toothing of a threaded sleeve 25 or with an inner toothing of the rotor 5. Axial displacement is possible in each case while each toothed disc is non-rotatably received.

Figure 7:
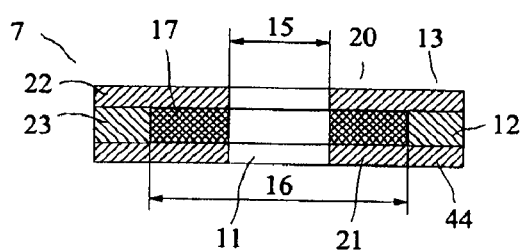
FIG. 7 is a schematic cross-section of a third embodiment of the toothed disc according to FIG. 3.
Figure 8:
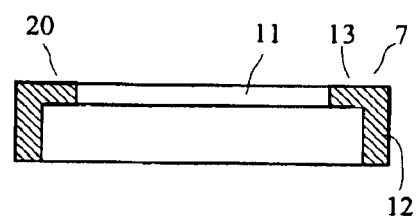
FIG. 8 is a schematic cross-section of a fourth embodiment of the toothed disc according to FIG. 3.

The toothed disc 7 illustrated in FIG. 7 consists of multiple parts comprising, an axial disc 22 with the axial wall 13 and the axial toothing 14, and a ring sleeve 23 provided with the radial wall 12, and a disc 44. The parts 22 and 23 are non-rotatably connected with one another. They may be configured as one-piece as illustrated in FIG. 8. The additional disc 44 may be provided which is biased by the springs 9a and 9b of the biasing device.

The entire toothed disc 7 is approximately U-shaped in cross-section with the legs 20 and 21 of the "U" extending radially inwardly.

In each case the axial wall 13 has an inner diameter 15 and an inner dimension 16 which is larger than the inner diameter 15. In all of the embodiments this will create at one or both of the toothed discs a receiving space 17 which is delimited radially inwardly through the inner diameter 15 and radially outwardly through the inner dimension 16. The inner dimension 16 is in particular the inner diameter in the region of the radial wall 12.

The receiving space 17 may be provided with a receiving ring configured in different shapes and made from different materials. A ring 18 approximately rectangular in cross-section may for example be provided as illustrated in the left half of FIG. 5. Also, a profiled receiving ring 18a may be provided comprising e.g. groove-shaped recesses or a comb-like cross-section.

The material of the receiving ring is in particular a lightweight material e.g. light metal. Preferably the ring 18 effects sound-damping at specific frequencies such that sounds can be adjusted. This allows to configure the hub including acoustic aspects.

A ring of plastic foam or the like is also conceivable. A particularly low weight can be achieved by employing an air-filled ring or no ring at all.

On the whole the invention will further reduce by another 10% the relatively low total weight of the hub while the operational reliability and durability are not reduced. The acoustic properties can concurrently be adapted to the customers' wishes.

Another advantage is the higher response rate since the toothed discs are considerably reduced in weight and can thus accelerate significantly faster while the spring forces of the springs 9a and 9b of the biasing device 9 remain unchanged.

The invention claimed is:

1. A hub for bicycles, comprising:
a hub axle,
a hub shell arranged substantially concentric with said hub axle,
at least two bearing units which are arranged substantially between said hub axle and said hub shell such that said hub shell is rotatably supported relative to said hub axle,
a rotor which is rotatably supported relative to said hub axle and configured such that at least one sprocket can be arranged on said rotor,
a freewheel device which is arranged between said rotor and said hub shell and which comprises two toothed disc units whose tooth faces are urged toward one another by a biasing device, for transmitting the drive torque from the rotor to the hub shell,
wherein said two toothed disc units are disposed around the hub axle and in a correctly assembled hub they are, at least in the idle state, disposed transverse to the longitudinal direction of said hub axle, and
at least one of said two toothed disc units having a toothed disc with a through hole and a radial wall and an axial wall having axial toothing, wherein the axial direction is parallel with the hub axle and the radial direction is transverse to the hub axle, wherein the inner diameter of the through hole is smaller at the axial wall than an inner dimension in the region of the radial wall such that a receiving space is formed at the at least one of said two toothed disc units around the hub axle between the inner diameter of the axial wall and the inner dimension of the radial wall, wherein at least one of said two toothed disc units is U-shaped in cross-section with the legs of the U-shaped cross-section extending radially inwardly toward the hub axle.

2. The hub according to claim 1 wherein at least one of said two toothed disc units is supported floating.

3. The hub according to claim 2 wherein both of said two toothed disc units are supported floating.

4. The hub according to claim 1, wherein at least one receiving ring is received in the receiving space.

5. The hub according to claim 4 wherein the receiving ring consists of a material selected from a group of materials consisting of light metals, plastic and fiber-reinforced plastic.

6. The hub according to claim 4, wherein the receiving ring effects a damping of vibrations.

7. The hub according to claim 4, wherein the receiving ring is structured and configured such that resonance of at least one of said two toothed disc units can be adjusted.

8. The hub according to claim 1, wherein at least one of said two toothed disc units comprises at least one axial disc and one ring sleeve.

9. The hub according to claim 1, wherein each of said two toothed disc units has a radially arranged outer profile which outer profile of the one toothed disc unit interacts with an inner profile of a threaded sleeve which is arranged in the hub shell and wherein the outer profile of the other toothed disc unit interacts with an inner profile in the rotor so as to enable axial displacement of each toothed disc while allowing transmission of the drive torque between the one toothed disc unit and the hub shell, and between the other toothed disc unit and the rotor.

10. The hub according to claim 1, wherein the hub axle is configured hollow and has a larger inner diameter than the outer diameter of the hub which is provided for being inserted into a dropout at a bicycle frame.

11. The hub according to claim 1, wherein at least one end of the hub axle is provided with a separate adapter ring comprising a diameter section provided for being inserted into a dropout at a bicycle frame to retain the hub in the bicycle frame.

12. The hub according to claim 11, wherein the adapter ring comprises a double flange which in conjunction with the hub shell achieves a non-contact sealing of the hub shell.

13. The hub according to claim 12, wherein between each flange of the double flange defines a narrow sealing gap and an expansion chamber.

14. The hub according to claim 1, wherein the rotor is provided with radially outwardly extending engaging means which serve to non-rotatably attach sprockets wherein at least one engaging means comprises at least one longitudinal groove.

15. The hub according to claim 1, wherein between the rotor and the hub shell a labyrinth seal is provided which comprises a sealing gap facing radially outwardly and which is followed by a radially inwardly expansion chamber which is followed radially inwardly by a second sealing gap.

16. The hub according to claim 15, wherein the second sealing gap is delimited by a conical rotor wall section whose diameter increases toward the hub shell.

17. The hub according to claim 1, wherein the hub shell comprises at least one hub flange for attaching spokes and extends radially outwardly from the hub shell wherein the radially outward end is concave in cross-section.

18. A rear wheel having a rim and a rear wheel hub and connecting elements between the rim and the rear wheel hub which rear wheel hub comprises:
- a hub axle,
- a hub shell arranged substantially concentric with said hub axle,
- at least two bearing units which are arranged substantially between said hub axle and said hub shell such that said hub shell is rotatably supported relative to said hub axle,
- a rotor which is rotatably supported relative to said hub axle and is configured such that at least one sprocket can be arranged on said rotor,
- a freewheel device which is arranged between said rotor and said hub shell and comprises two toothed disc units whose tooth faces are urged toward one another by a biasing device for transmitting the drive torque from the rotor to the hub shell, wherein said two toothed disc units are disposed around the hub axle and in a correctly assembled hub they are, at least in the idle state, disposed transverse to the longitudinal direction of said hub axle, and at least one of said two toothed disc units includes a toothed disc having a through hole and a radial wall and an axial wall having axial toothing, wherein the axial direction is parallel with the hub axle and the radial direction is transverse to the hub axle, wherein the inner diameter of the through hole is smaller at the axial wall than an inner dimension in the region of the radial wall such that a receiving space is formed at the at least one of said two toothed disc units around the hub axle between the inner diameter of the axial wall and the inner dimension of the radial wall, wherein at least one of said two toothed disc units is U-shaped in cross-section with the legs of the U-shaped cross-section extending radially inwardly toward the hub axle.

* * * * *